(No Model.)
L. STERNE & D. CLERK.
LIFT OR CHECK VALVE.
No. 263,989. Patented Sept. 5, 1882.
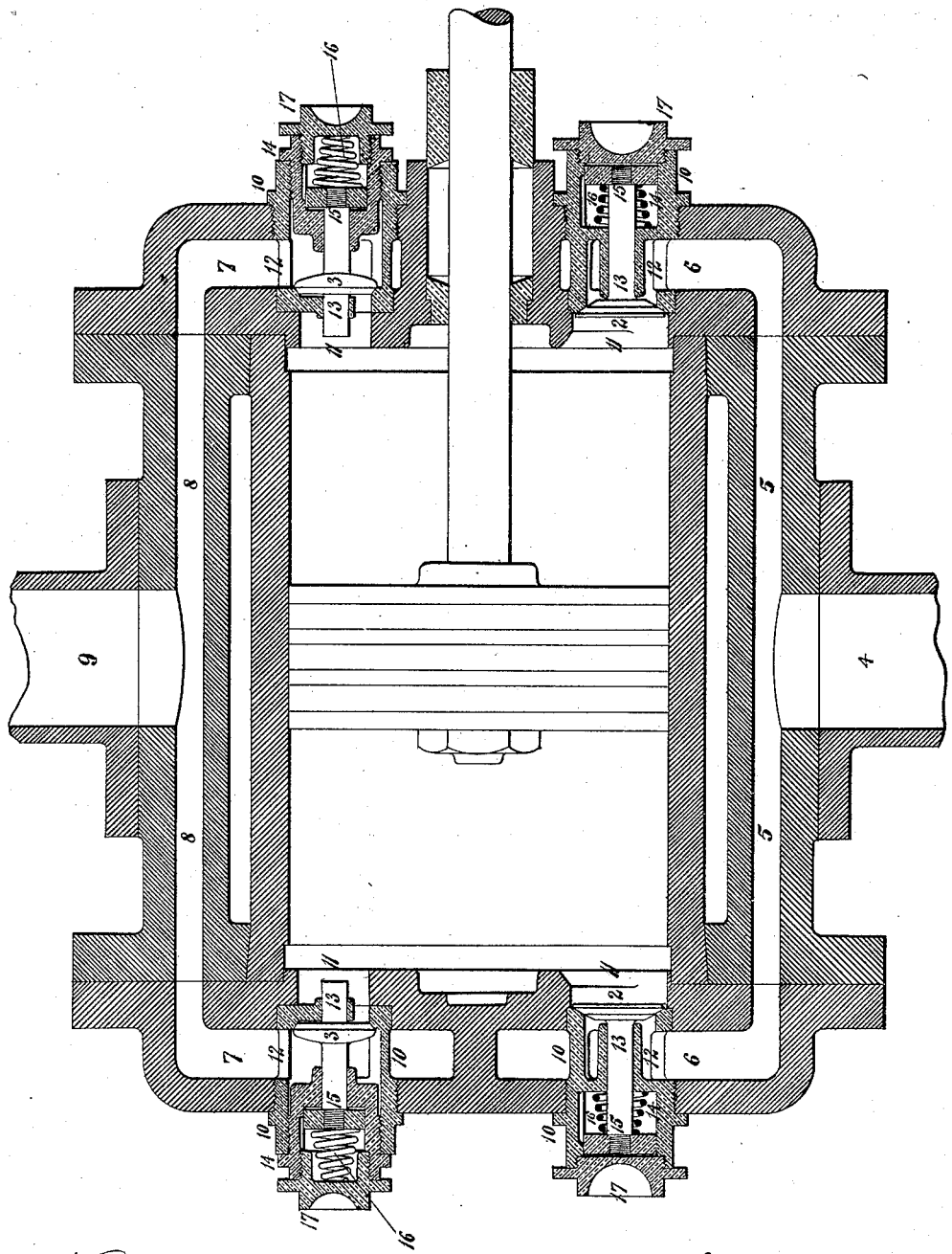

UNITED STATES PATENT OFFICE.

LOUIS STERNE, OF LONDON, ENGLAND, AND DUGALD CLERK, OF GLASGOW, SCOTLAND.

LIFT OR CHECK VALVE.

SPECIFICATION forming part of Letters Patent No. 263,989, dated September 5, 1882.

Application filed May 19, 1882. (No model.) Patented in England August 15, 1881, No. 3,536.

*To all whom it may concern:*

Be it known that we, LOUIS STERNE and DUGALD CLERK, subjects of the Queen of Great Britain, and residing respectively at London, England, and at Glasgow, Scotland, have invented certain Improvements in Lift or Check Valves, (for which we have obtained a patent in Great Britain, dated 15th August, 1881, No. 3,536,) of which the following is a specification.

Our said invention has for its object to improve the construction and action of lift or check valves, and to make them capable of working satisfactorily in connection with air-compressing cylinders or in connection with various kinds of pumps when such apparatus is worked at considerable speed.

Our invention consists in making the valves close quickly, and in providing means to prevent them from striking their seats injuriously and from making a noise and rattling when they close, the appliances for attaining these results being in immediate connection with the valves, which are opened by the pressure on them of the fluid whose passage they control, the valves having no connection with external working parts. We apply springs to the valves to make them close quickly, excepting in cases in which the valves open or lift vertically and will close with the desired rapidity by their own weight; and to prevent concussion or rattling when closing we provide them with dash-pots or air-cushion appliances in the manner hereinafter fully described.

The drawing shows a longitudinal section, showing our improved lift or check valves as applied to an air-compressing cylinder.

The cylinder is fitted with inlet-valves 2 and outlet-valves 3, which are substantially the same, but the arrangement of which and of the boxes containing them is necessarily slightly modified to suit the respective directions in which the fluid has to pass through them. The fluid approaches the cylinder by a pipe, 4, which communicates by a passage, 5, with spaces 6 in the cylinder ends or covers. Similar but distinct spaces, 7, also in the cylinder ends or covers, communicate by a passage, 8, with a pipe, 9, which leads the compressed or pumped fluid away from the cylinder. Each valve 2 3 is contained in a box, 10, which is inserted through the outer shell of the cylinder end or cover in which it is fixed by screwing, and each box 10 extends across the respective space 6 or 7, its inner end entering and fitting in a rabbet or seat formed for it around a circular opening, 11, communicating with the interior of the cylinder. One or more lateral openings 12, formed in the side of each valve-box 10, put the outer side of each valve 2 3 in communication with the respective space 6 7. Each valve 2 3 is of a disk form with a conical edge shaped to close upon a counterpart conical seat formed around the inner end of each valve-box 10, the seats for the inlet-valves 2 facing toward the interior of the cylinder, and those for the outlet-valves 3 facing the other way. Each valve 2 3 is fixed on a spindle, 13, passing through a guide into a small cylinder, 14, which in the case of the inlet-valves 2 is formed in the same piece as the valve-box 10, but which in the case of the outlet-valves 3 is formed in a separate piece screwed into the valve-box 10, this latter arrangement being required for placing the valve 3, which has to work inside of its box, whereas the inlet-valve 2 does not. The outer end of each valve-spindle 13 has a piston, 15, fixed to it, and a spring, 16, is applied on one side of the piston in a manner to be compressed when the valve is opened. Each piston 15 is made a good fit to its cylinder 14 without being very tight; and a small groove is formed in the side of the cylinder to allow air to pass with sufficient freedom from one side of the piston to the other, excepting when the piston is at or near that end of the cylinder toward which it moves when its valve is closing. In the drawing this groove is indicated by a line along the upper side of each cylinder 14, and in practice its extent is determined experimentally to suit the speeds of action and other circumstances of different cases. As each valve closes air is confined between its piston 15 and the end of its cylinder 14, and acts as a cushion, so that while the springs cause the valves to close very quickly their motion is arrested by the air-cushion just before actual contact with the seats takes place, and that contact is finally effected in a quiet manner. Covers 17 are screwed upon the outer ends of the valve-boxes 10, and give convenient access to some of the parts, while the valve-boxes 10 themselves can be easily unscrewed and removed each with all its details.

What we claim as our invention is—

1. The combination of a lift or check valve and a closing-spring with a dash-pot or air-cushioning piston and cylinder and an inclosing box, substantially as set forth.

2. The combination of a cylinder and piston with a box, 10, adapted to be screwed in the cylinder, and carrying a valve and valve-seat, and a dash-pot or air-cushioning piston and cylinder, substantially as described.

3. The combination of a check or lift valve with an air-cushioning piston and a cylinder having a groove formed in its inner face for the passage of the air from one side of the piston to the other, substantially as and for the purpose set forth.

In testimony whereof we have signed our names to this specification in the presence of two subscribing witnesses.

L. STERNE.
DUGALD CLERK.

Witnesses:
EDMUND HUNT,
DAVID FERGUSON.